US 6,614,732 B2

(12) United States Patent
Nonaka et al.

(10) Patent No.: US 6,614,732 B2
(45) Date of Patent: Sep. 2, 2003

(54) RECORD AND PLAYBACK APPARATUS AND RECORDING METHOD

(75) Inventors: Yoshiya Nonaka, Kawagoe (JP); Hiroaki Shibasaki, Meguro (JP)

(73) Assignee: Pioneer Corporation, Tokyo-to (JP)

( * ) Notice: Subject to any disclaimer, the term of this patent is extended or adjusted under 35 U.S.C. 154(b) by 320 days.

(21) Appl. No.: 09/822,255

(22) Filed: Apr. 2, 2001

(65) Prior Publication Data

US 2001/0026504 A1 Oct. 4, 2001

(30) Foreign Application Priority Data

Mar. 31, 2000 (JP) ..................................... P2000-099904

(51) Int. Cl.[7] .............................................. G11B 21/08
(52) U.S. Cl. ................. 369/30.18; 369/53.2; 369/275.3
(58) Field of Search ........................... 369/275.3, 30.18, 369/94, 59.1, 59.16, 59.23, 53.2, 53.41, 30.01, 32.01, 59.25; 386/105, 125, 95, 97; 84/610

(56) References Cited

U.S. PATENT DOCUMENTS 5,889,746 A * 3/1999 Moriyama et al. ....... 369/275.3
6,215,746 B1 * 4/2001 Ando et al. ................ 369/53.2
6,539,168 B2 * 3/2003 Ando et al. ................. 386/105

* cited by examiner

*Primary Examiner*—Ali Neyzari
(74) *Attorney, Agent, or Firm*—Sughrue Mion, PLLC (57) ABSTRACT

A recording/reproducing apparatus comprises a program data reading-out device, a classification information storage device, a program data storage device and a controlling device. The program data reading-out device reads out program data from a recording medium. The program data and identification information for identifying the program data are recorded on the medium. The classification information storage device previously holds classification information for classifying the program data in association with the identification information. In the program data storage device, the program data can be written in and read out. The controlling device collates, when receiving a program recording command, the identification information between the medium and the classification information storage device, classifies the program data into groups in accordance with the classification information corresponding to the program data, and controls operation for recording the program data on the program data storage device, while controlling operation of reproducing predetermined program data which belong to the selected group when receiving a program reproduction command.

10 Claims, 12 Drawing Sheets

ISRC

| COUNTRY CODE | OWNER | RECORDING YEAR | SERIAL NUMBER |
|---|---|---|---|

| COUNTRY CODE | OWNER | RECORDING YEAR | SERIAL NUMBER | GENRE/GENRE CODE | PERFORMER |

|←——————————— ISRC ———————————→|

FIG. 7

| GENRE CODE | TEXT |
|---|---|
| 000 | Blues |
| 001 | Classic Rock |
| 002 | Country |
| 003 | Dance |
| 004 | Disco |
| 005 | Funk |
| 006 | Grunge |
| 007 | Hip-Hop |
| 008 | Jazz |
| : | : |

- POPS 1
  - file1. a3d
  - file4. a3d
  - file5. a3d
  - file7. a3d
  - file6. a3d
  - .
  - .
- CLASSIC 1
  - file2. a3d
  - file10. a3d
  - file9. a3d
  - .
  - .
- .
- .
- .

FIG. 11(b)

- BEETHOVEN 1
  - file2. tag
  - file9. tag
  - .
  - .
- BACH 1
  - file11. tag
  - file12. tag
  - .
  - .
- .
- .
- .

FIG.12

RECORD AND PLAYBACK APPARATUS AND RECORDING METHOD

BACKGROUND OF THE INVENTION

1. Field of the Invention

The present invention relates to a technical field of a recording/reproducing apparatus for managing program data recorded on a recording medium to record and reproduce the program data, and more particularly to a technical field of a recording/reproducing apparatus for storing pro ram data recorded on a disc-shaped recording medium such as a CD into a hard disc to manage the program data for each group.

2. Description of the Related Art

In recent years, a type of disc changers which can load a plurality of discs therein at once and selectively reproduce a predetermined disc has widely been used for reproducing program data from a disc-shaped recording medium such as a CD, in order to reduce users' trouble to change discs. However, such a disc changer can store only limited number of discs at once because of physical restriction. Therefore, if the program data of the disc loaded once can be stored in a supplementary storage device and reproduced as the need arises, there would be no need to repeatedly load the disc into the disc changer, providing users with convenience.

On the other hand, it is possible to use a hard disc as the supplementary storage device of the above-described disc changer since the hard disc has mainly been used as a large-capacity external storage device currently. Changing operation of the disc that has once been loaded becomes almost unnecessary because enormous number of program data can be stored in the hard disc. Therefore, the users are enabled to reproduce programs without difficulty.

However, if the number of program data stored in the hard disc increases, it is time-consuming and complicated to find a specific program among a large number of programs when users selectively reproduce a desired program. Moreover, it is conceivable to, in order to make selecting programs easier, classify the programs stored in the hard disc into groups by setting classification information to the programs, for example, into each performer group or into each genre group if the programs are songs, and manage a plurality of program data. However, in this case, a user may take a heavier burden since the user has to do the operation to decide which group the program belongs to, and to give classification information to the program every time at which the user performs recording function. Moreover, it is also conceivable to incorporate a system for searching processing into the recording/reproducing apparatus in order to perform a high-speed searching processing when the program data is reproduced. However, the cost of the apparatus increases because structures of the hardware and software become more complicated.

SUMMARY OF THE INVENTION

Here, in view of the above-described problems, the present invention has an object to provide a recording/reproducing apparatus that can manage many program data by automatically classifying them into groups when storing many program data such as music data in a storage device, has a simple structure, and enables users to easily select programs without any complicated operation.

In order to solve the above-described problem, a recording/reproducing apparatus according to the first aspect of the present invention comprises:

a program data reading-out device for reading out program data from a recording medium on which the program data and identification information for identifying the program data are recorded, said recording medium being to be loaded into the program data reading-out device;

a classification information storage device for previously holding classification information for classifying the program data in association with said identification information;

a program data storage device in which a plurality of the program data can be written in and read out; and a controlling device for, when receiving a command for recording the program data, collating said identification information between said recording medium and said classification information storage device, for classifying the program data into groups in accordance with said classification information corresponding to the program data which is read out from said recording medium, and for controlling operation for recording the program data on said program data storage device, while controlling operation of reproducing predetermined program data which belong to the selected group when receiving a command for reproducing the program data.

According to this invention, it becomes possible for the recording/reproducing apparatus to, when a command for recording the program data recorded on the recording medium such as a CD is received, distinguish the classified information corresponding to the program data by performing a collating processing based on the identification information, automatically classify the program data into groups, write the program data in the program data storage device, and manage all of the subsequent reproducing operations for each group. Accordingly, the functional and convenient recording/reproducing apparatus can be realized since there is no need for users to perform complicated operation such as classifying the respective program data into groups while a large amount of program data are recorded by using a large-capacity hard disc and the like.

The second aspect of the present invention provides the recording/reproducing apparatus according to the first aspect, in which the controlling device performances collation of the identification information during operation of reproducing the program data recorded on the recording medium.

According to this invention, when reading-out of the recording medium starts by a command for reproducing the program data, the collating processing is performed on the basis of the identification information extracted as the program data are reproduced, and the program data are managed for each group in the same manner as described above so that the program data can automatically be classified into groups by the time at which the reproducing operation is finished. Therefore, program management can be performed rationally without wasting time.

The third aspect of the present invention provides the recording/reproducing apparatus according to the first aspect, in which the classification information storage device and the program data storage device comprise a hard-disc device.

According to this invention, the program data and the classification information are stored in the hard-disc apparatus so that the programs can be recorded by using a storage device having a high-speed performance, a large-capacity and a high general usability.

The fourth aspect of the present invention provides the recording/reproducing apparatus according to the first aspect, in which a TOC (Table of Contents) for managing the data in the recording medium is extracted as the identification information, and the identification information to which the corresponding classification information is added is previously held by the classification information storage device.

According to this invention, the classification information is added to the TOC recorded on many recording media for recording the program data, and the TOC are stored in the classification information storage device before the above-described collating processing is performed so that the program data in the recording medium such as a CD can easily be identified and classified into groups.

The fifth aspect of the present invention provides the recording/reproducing apparatus according to the first aspect, in which the classification information storage device previously holds the classification information to which the identification information composed of ISRC (International Standard Recording Code) attendant on the respective program data is added.

According to this invention, the classification information is added to the ISRC recorded along with the respective program data, and the ISRC are stored to the classification information storage device before the above-described collating processing is performed so that the respective program data can easily be identified and classified into groups.

The sixth aspect of the present invention provides the recording/reproducing apparatus according to the first aspect, in which the program data is music data, and the classification information includes information indicating a performer corresponding to the music data.

According to this invention, the music data are classified into groups by referring to the information in the classification information that indicates the performer of the program data so that the music data of the user's favorite performer can easily be selected from the recorded music data.

The seventh aspect of the present invention provides the recording/reproducing apparatus according to the first aspect, in which the classification information includes information indicating a genre corresponding to the program data.

According to this invention, the program data are classified into groups by referring to the information in the classification information that indicates the genre of the program data so that the program data of the user's favorite genre can easily be selected from the recorded program data.

The eighth aspect of the present invention provides the recording/reproducing apparatus according to the first aspect, in which the program data and the classification information are recorded in a file format respectively, and are associated with each other by file names.

According to this invention, when the collating processing based on the identification information is performed, the files of the program data and the classification information are compared with each other, and are distinguished on the basis of the file names so that the groups can be managed even in easier way.

The ninth aspect of the present invention provides the recording/reproducing apparatus according to the eighth aspect, in which the controlling device creates and manages list data of the file names listed of the program data in each group so that the program data can be selected from a predetermined group on the basis of the list data.

According to this invention, it becomes possible to select the program data belonging to a arbitrary group by referring to the list data when the operation of reproducing the program data is performed so that the user can easily select the desired program from the list data and reproduce it very conveniently.

The tenth aspect of the present invention provides a recording method for performing recording by using a recording medium on which program data and identification information for identifying the program data are recorded, a classification information storage device for previously holding classification information for classifying the program data in association with said identification information, and a program data storage device in which a plurality of program data can be written-in and read out, comprising the steps of:

when a command for recording the program data is received, collating said identification information between said recording medium and said classification information storage device while reading out the program data from said recording medium;

classifying the program data read out from said recording medium into each group in accordance with said classification information corresponding to the program data; and recording said program data on said program data storage device.

According to this invention, it becomes possible to, when a command for recording the program data recorded on the recording medium such as a CD is received, distinguish the classified information corresponding to the program data by performing a collating processing based on the identification information, automatically classify the program data into groups, write the program data in the program data storage device, and manage the respective programs for each group. Accordingly, various kinds of programs can easily be managed since there is no need for users to perform complicated operation such as classifying the respective program data into groups.

DESCRIPTION OF THE PREFERRED EMBODIMENTS

Hereinafter, a preferred embodiment of the present invention will be explained with reference to the accompanied drawings. In the embodiment below, description will be given of the cases where the recording/reproducing apparatus of the present invention is applied to a recording/reproducing apparatus for recording and reproducing songs. More specifically, the recording/reproducing apparatus of this embodiment is designed so as to read out music data as an example of program data recorded on a CD, and store the data in a hard disc in accordance with a command for recording the songs as a command for recording the data.

Figure 1:
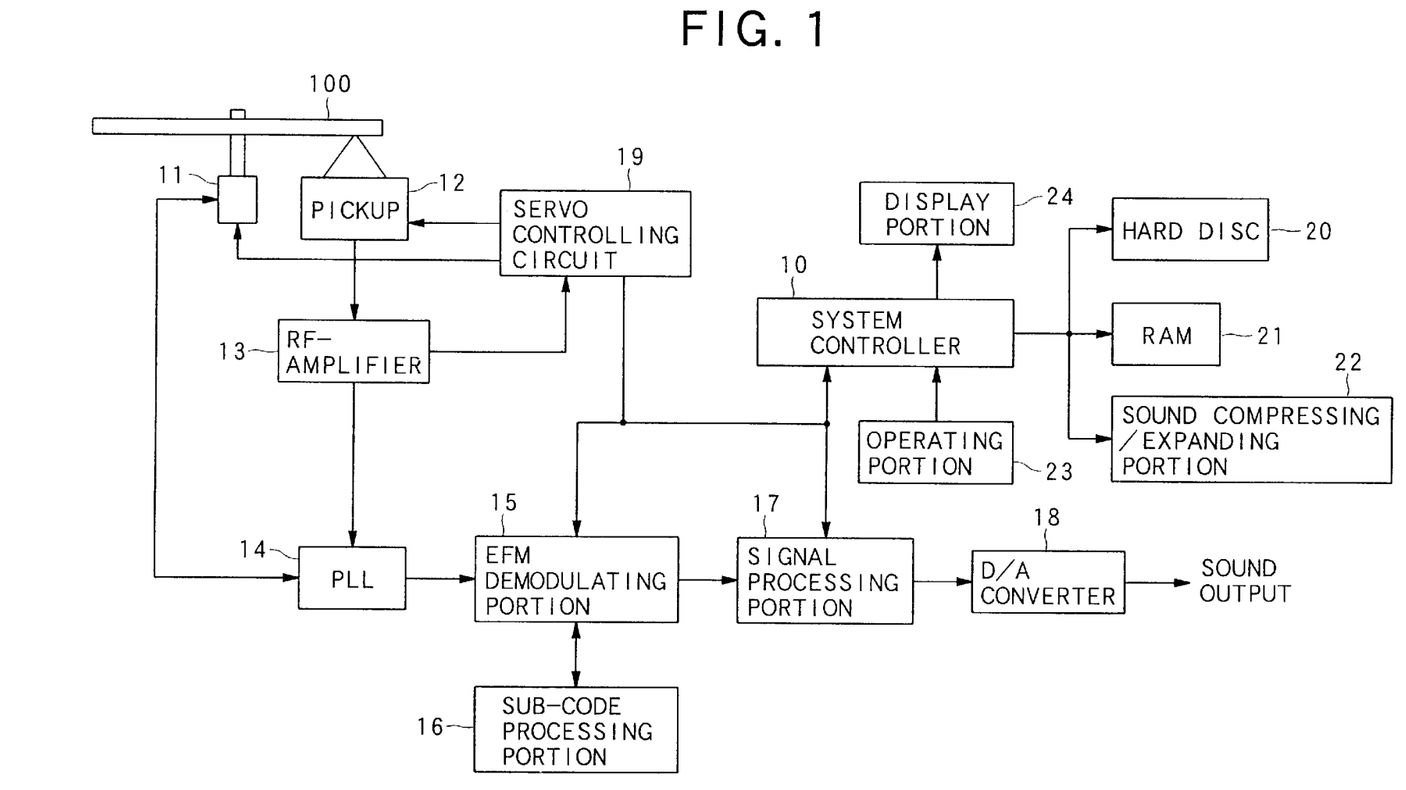
FIG. 1 is a block diagram showing a total configuration of a recording/reproducing apparatus according to one embodiment of the present invention.

FIG. 1 is a block diagram showing a total configuration of the recording/reproducing apparatus according to this embodiment. The recording/reproducing apparatus shown in FIG. 1 is designed so as to include a system controller 10, a spindle motor 11, a pickup 12, an RF-amplifier 13, a PLL 14, an EFM-demodulating portion 15, a sub-code processing portion 16, a signal processing portion 17, a D/A converter 18, a servo controlling circuit 19, a hard disc 20, a RAM 21, a sound compressing/expanding portion 22, an operating portion 23, and a display portion 24.

In FIG. 1, the disc 100 loaded in the recording/reproducing apparatus is irradiated with a light beam from the pickup 12 while being rotational-driven by the spindle motor 11 at a prescribed linear velocity. Then, an RF signal is outputted from the pickup 12 on the basis of a reflection light from the disc 100 and is amplified by the RF amplifier 13. The RF amplifier 13 provided with a processing circuit of the RF signal generates a tracking error signal and a focus error signal by making the RF signal into a binary form, and supplies the signals to the servo controlling circuit 19. The servo controlling circuit 19 controls rotation of the spindle motor 11 while performing tracking control based on the tracking error signal and focus control based on the focus error signal.

On the other hand, a clock is generated by inputting to the PLL 14 the RF signal which is made into a binary form by the RF amplifier 13 while EFM (Eight to Fourteen Modulation) demodulation is performed by the EFM demodulating portion 15 with a standard of the clock of the PLL 14. A modulation signal outputted from the EFM demodulating portion 15 is supplied to the signal processing portion 17, is subjected to an error correction processing and so on, and is outputted as a digital audio signal. The digital audio signal is converted into an analog sound signal by the D/A converter 18, and is outputted to the outside.

Moreover, the sound compressing/expanding portion 22 compresses the digital audio signal outputted from the signal processing portion 17 in accordance with a predetermined format so as to generate a compressed audio signal while expanding the compressed audio signal so as to restore the original digital audio signal. The compressing processing and expanding processing can be performed by, for example, a DSP (Digital Signal Processor). The compressed audio signals outputted from the sound compressing/expanding portion 22 are temporarily accumulated in the RAM 21.

In this embodiment, the hard disc 20 is used as a storing device for recording the music data. The compressed audio signal corresponding to the music data to be recorded is transferred from the RAM 21 to the hard disc 20, and is stored in a predetermined storage area as a music file. Furthermore, the music file and various data files related to it are stored in the hard disc 20.

The system controller 10 generally controls the operation of the recording/reproducing apparatus shown in FIG. 1. The system controller 10, which is connected to the respective components of the recording/reproducing apparatus, performs controlling by transmitting and receiving the data or the controlling signals. An operation command from outside to the system controller 10 is given by a user's operation to the operating portion 23. Moreover, the user can instruct implementation of the recording operation or reproducing operation by pushing a key provided on the operating portion 23 when the user sees information of the processing performed by the system controller 10 which is indicated on the display portion 24. Description will be given later of details on the operating portion 23 and the display portion 24.

Now, description will be given of a data format of the disc 100 with reference to FIG. 2 to FIG. 5. In this embodiment, explanation will be given of the cases where a CD is used as the disc 100.

Figure 2:
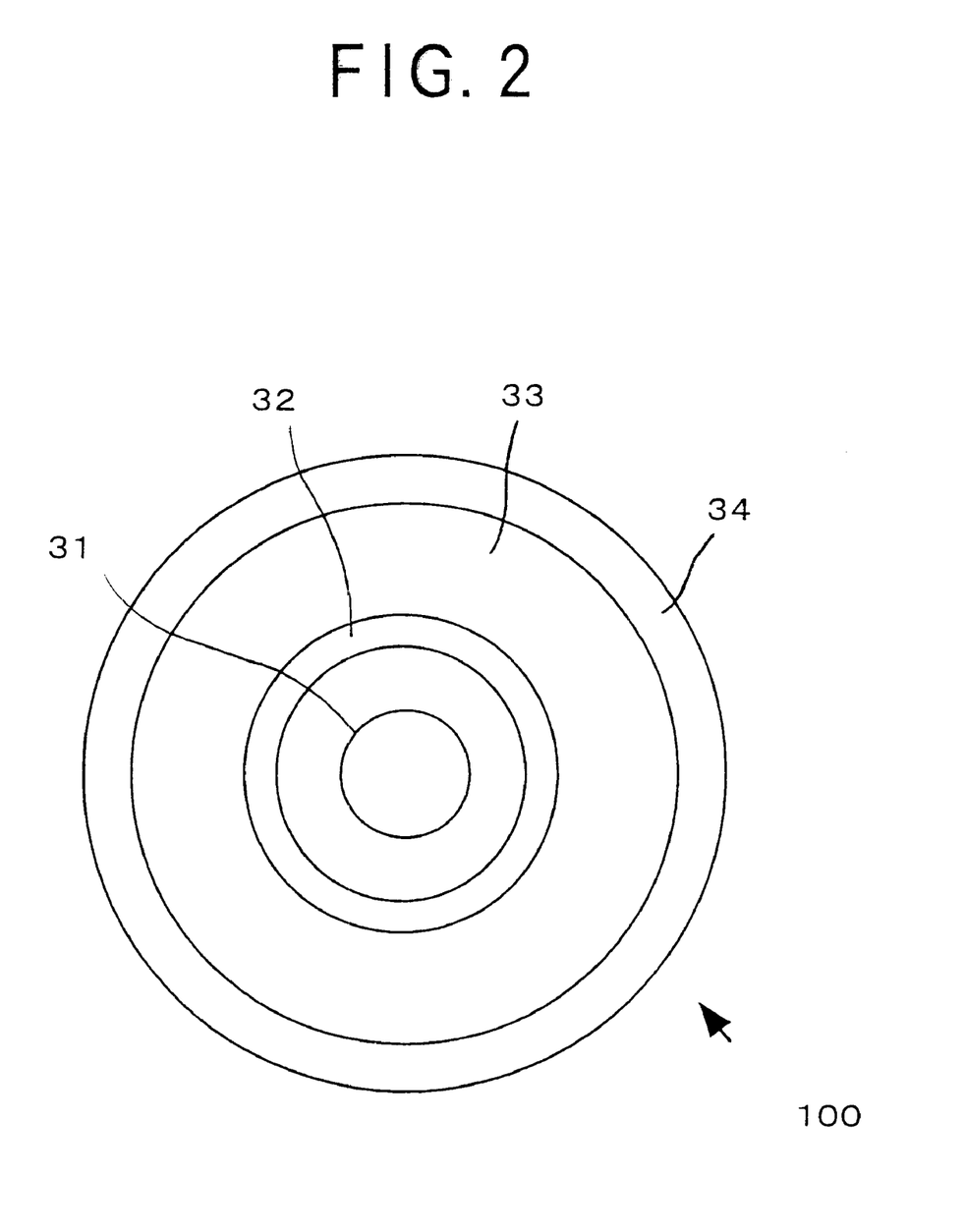
FIG. 2 is a diagram showing a configuration of an information recording surface of a disc.

FIG. 2 shows a configuration of an information recording surface of the disc 100. As is shown in FIG. 2, on the information recording surface of the disc 100, a clamp hole 31 for holding the disc 100 at a place is provided at the center, and a read-in area 32, a program area 33, and a read-out area 34 are provided around the hole in this order from the center respectively.

In the above-described configuration, the read-in area 32 is an area on which the TOC (Table of Contents) for managing the programs are recorded, and which is accessed preceding the program area 33. The program area 33 is an area on which the various kinds of program data are recorded, and for example, the program data composed of a plurality of music data can be recorded on the program area 33. The read-out area 34 is an area succeeding the program area 33, and a code indicating the end of the program is recorded thereon.

Figure 3:
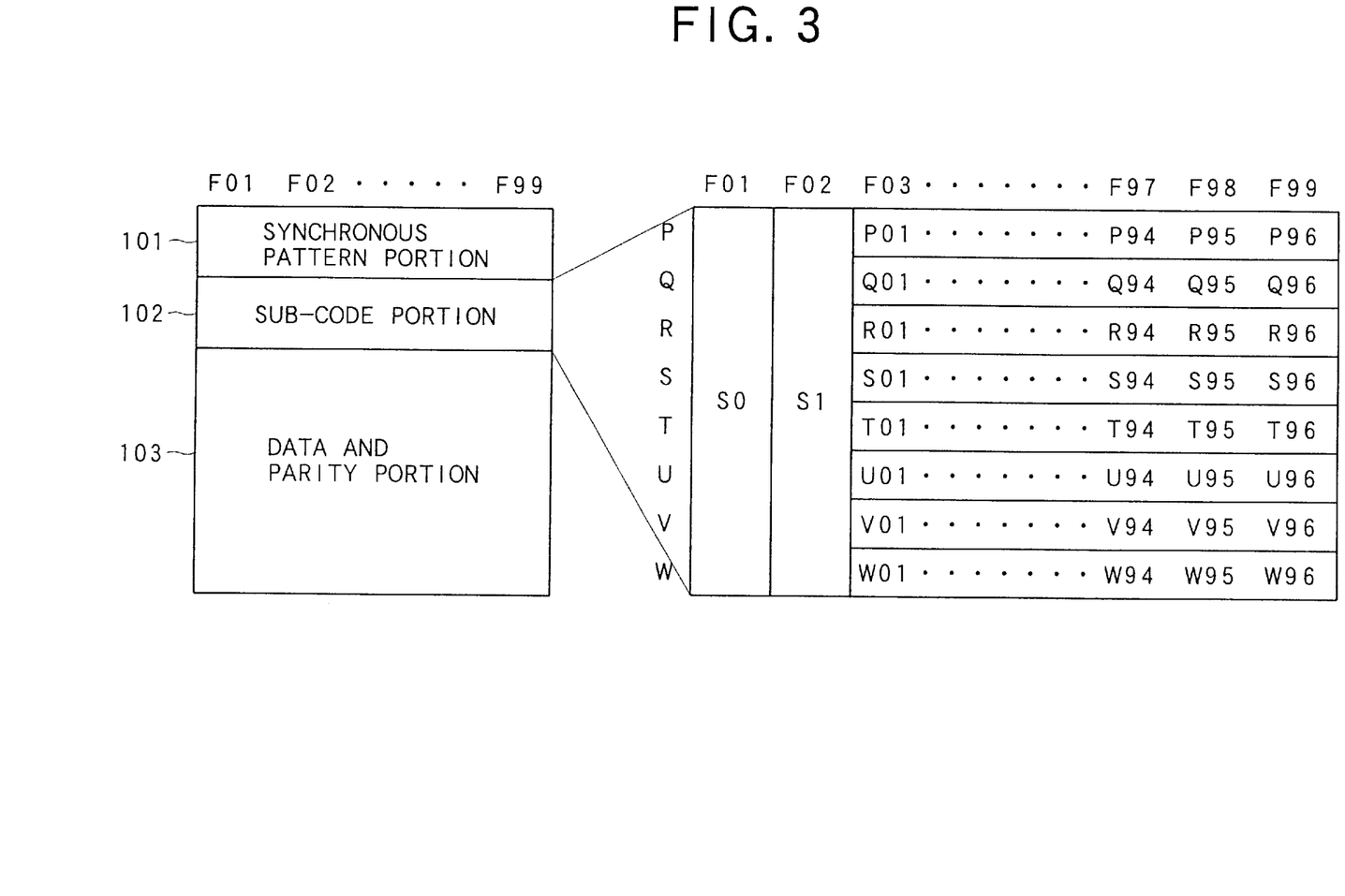
FIG. 3 is a diagram showing a data structure of a sub-code frame of the disc.

FIG. 3 shows a data structure of a sub-code frame of the disc 100. As is shown in FIG. 3, a plurality of frames F01 to F99 are collected into a unit called sub-code frame. This sub-code frame includes a synchronous pattern portion 101 on which synchronous patterns are recorded, a sub-code portion 102 on which the sub-code data are recorded, and a data and parity portion 103 on which the program data and parities corresponding thereto are recorded.

On the right-hand side in FIG. 3, a detailed data structure of the sub-code data recorded on the sub-code portion 102 is shown. The leading frames F01 and F02 correspond to the synchronous patterns S0 and S1 respectively. Prescribed patterns based on the EFM demodulation system are used as the synchronous patterns S0 and S1. The succeeding frames of F03 to F99 compose P channel to W channel of the sub-codes respectively. For example, the P channel is composed of a part of the synchronous patterns S0 and S1, and P01 to P96. The other channels are composed in a similar manner.

In FIG. 3, the P channel of the sub-codes includes information indicating the existence of the program, and the reproducing operation of the recording/reproducing apparatus can be controlled on the basis of the information. Moreover, the Q channel of the sub-codes includes management information such as time information of the disc 100, and information related to the song on the disc 100 which is being played can be identified on the basis of the information. Identification information according to the ISRC (International Standard Recording Code) is recorded on the Q channel, and a detailed explanation thereof will be given later. Furthermore, in FIG. 3, relevant information such as still pictures or the lyrics of the song can be recorded on the R channel to W channel of the sub-codes.

Figure 4:
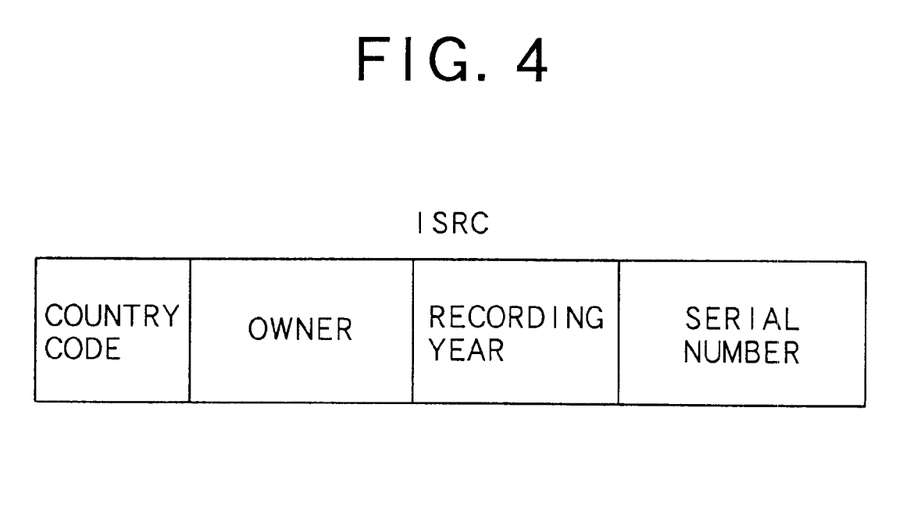
FIG. 4 is a diagram showing a data structure of an ISRC.

FIG. 4 shows a data structure of the above-described ISRC. The ISRC is a generic term for the international standard recording code regulated by ISO3901, and is managed for each track on the disc 100. As is shown in FIG. 4, the ISRC includes information of a country code, an owner, a recording year and serial number of the song.

In the ISRC in FIG. 4, the country code indicates the country in which the owner exists, the owner indicates a group that has a copyright of the song, the recording year indicates the last two digit of the year in which the song is recorded on the disc 100, and the serial number indicates a registration number given to each song. Data sizes assigned to the respective information are 2 bytes for the country code, 3 bytes for the owner, 2 bytes for the recording year, and 5 bytes for the serial number. Concretely, the ISRC is composed of the numbers described as, for example, the country code "01", the owner "005", the recording year "99", and the serial number "00000".

As is described above, the ISRC is managed by the Q channel of the sub-codes. A code of 12 byte is constructed in a unit of 13.3 m/s at a time of reproduction of the song on the disc 100. Therefore, one ISRC with a structure in FIG. 4 is extracted so that the information of the song corresponding thereto can be distinguished.

Figure 5:
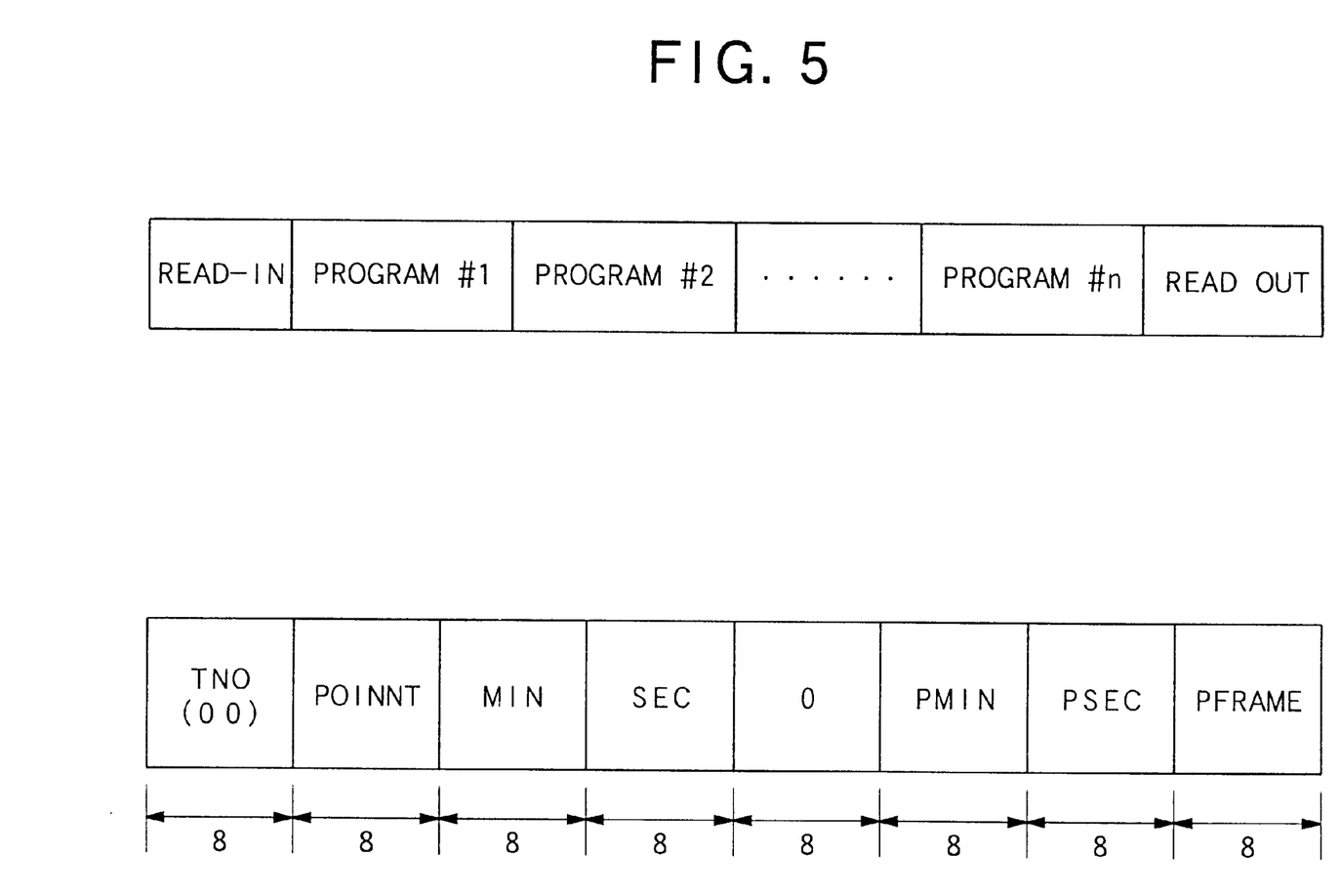
FIG. 5 is a diagram showing a data structure of a TOC recorded in a read-in area.

FIG. 5 is a diagram showing a data structure of the TOC recorded on the read-in area 32. In FIG. 5(a), the TOC is recorded on the read-in area 32 by using the above-described Q channel of the sub-codes. Moreover, programs #1 to #n having the number of "n" are recorded in order on the program area 33 succeeding the read-in area 32 and preceding the read-out area 34.

In a data structure of the TOC shown in FIG. 5(b), a TNO is a truck number, and the TNO for read-in is 00. Moreover, as is shown in the same figure, a POINT is a unit of a further subdivided program, and takes values of 00, 01 to 99, A0, A1, and A2. When the POINT is between 00 to 99, PMIN, PSEC, and PFRAME indicate the absolute time at which the program starts. When the POINT is A0, PMIN indicates the first track number on the disc 100, and PSEC and PFRAME become 00. When the POINT is A1, the PMIN indicates the last track number on the disc 100, and the PSEC and PFRAME become 00. When the POINT is A2, the PMIN, PSEC and PFRAME indicate the absolute time at which readout starts. On the read-in area 34, those contents are repeatedly recorded three times respectively.

Figure 6:
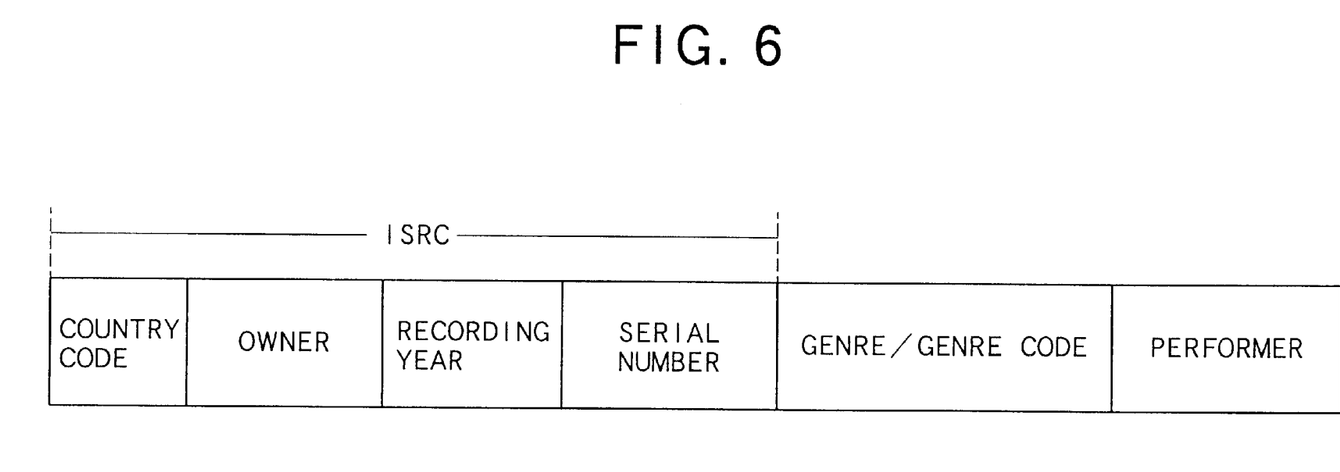
FIG. 6 is a diagram showing a data format of an ISRC associated file.
Figure 7:
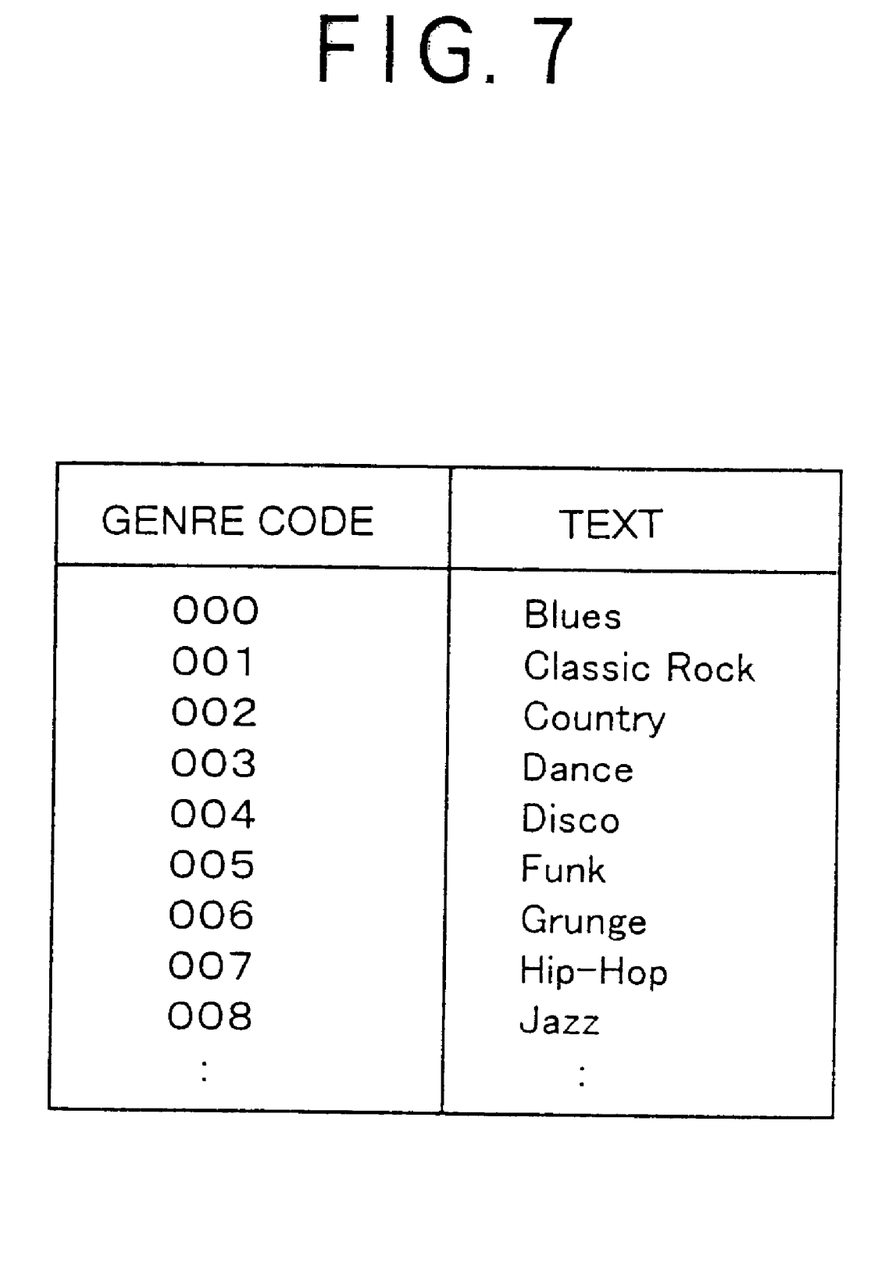
FIG. 7 is a diagram showing a concrete example of a code system file of a genre code.
Figure 8:
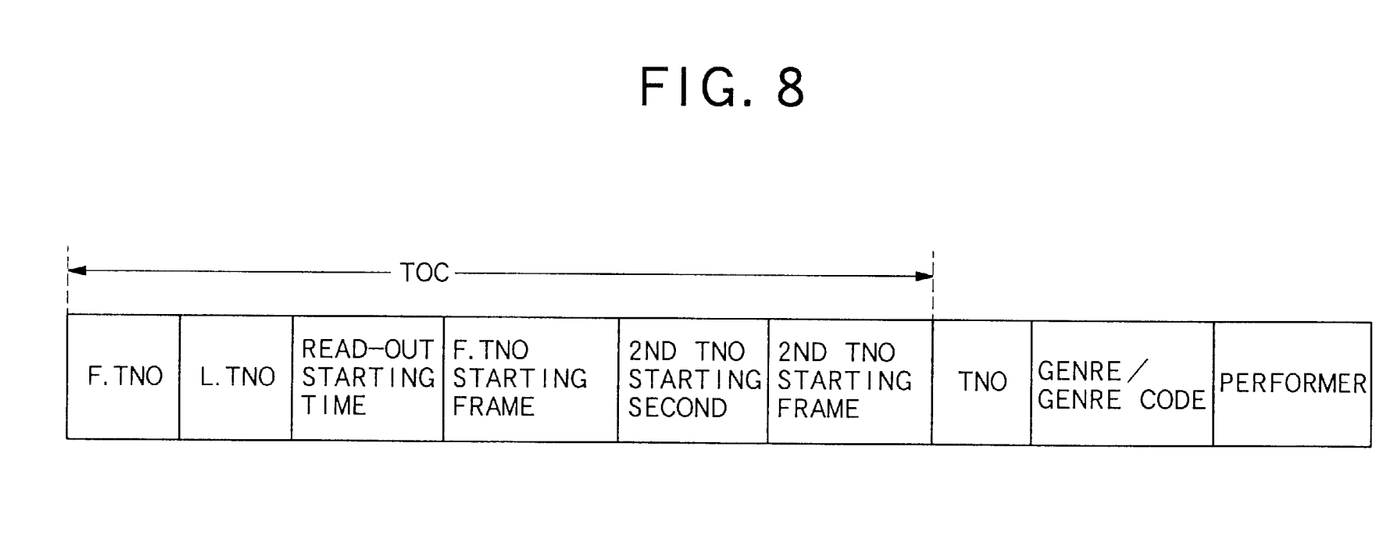
FIG. 8 is a diagram showing a data format of a TOC associated file.

With reference to FIG. 6 to FIG. 8, an explanation will be given of the identification information for identifying songs which is previously recorded on the hard disc 20. As will be described later, the identification information includes an ISRC associated file and a TOC associated file. Prescribed identification information corresponding to a plurality of music data are previously written in the hard disc 20 at the time at which the recording/reproducing apparatus of this embodiment is shipped.

FIG. 6 shows a data format of the ISRC associated file in identification information. As is shown in FIG. 6, the ISRC associated file is composed by adding the information of a performer and genre or genre code to the above-described ISRC.

The genre in the ISRC associated file is the information for classifying the song, and the genre code is the information of a coded genre. Accordingly, use of either the genre or the genre code suffices. Moreover, the performer in the ISRC associated file is composed of text information of the name of the performer of the song. It is sufficient to have the respective data sizes of approximately 10 to 20 bytes for the genre and the performer, and approximately 3 bytes for the genre code. Besides, a code-system file is separately required when the genre code is used.

A concrete example of the code-system file of the genre code is shown in FIG. 7. As is shown in FIG. 7, the genre codes and the text information corresponding to the genre of the song correspond to each other. Consequently, the text information to be added to the ISRC associated file in FIG. 6 can be extracted from the code-system file in FIG. 7.

FIG. 8 shows a data format of the TOC associated file in the identification information. As is shown in FIG. 8, the TOC associated file is composed by extracting the predetermined data from the TOC and adding each information of the performer that is required for grouping a specific song to the predetermined data mentioned above. As is described above, the TOC is managed in a unit of the disc 100. However, in FIG. 8, the TOC associated file is composed by extracting the TOC corresponding to the respect songs.

The TOC part of the TOC associated file in FIG. 8 includes the respective data of an F.TNO (the first track number), an L.TNO (the last track number), a read-out starting time (the time at which read-out starts), an F.TNO starting frame (the leading frame of the first track), the 2nd TNO starting second (the second at which the second track starts), and the 2nd TNO starting frame (the leading frame of the second track). Concerning the POINT extracted from the TOC, the F.TNO is A0, the L.TNO is A1, the read-out starting time is A2, the F.TNO starting frame is 01, the 2nd TNO starting second is 02, and the 2nd TNO starting frame is 03.

Moreover, as is shown in FIG. 8, the information added to the TOC associated file includes the genre or the genre code, the performer, and the track number TNO of a specific song. The data size of the TNO is 2 bytes, and the data sizes of the genre, the genre code, and the performer are the same as those of the above-described ISRC.

Figure 9:
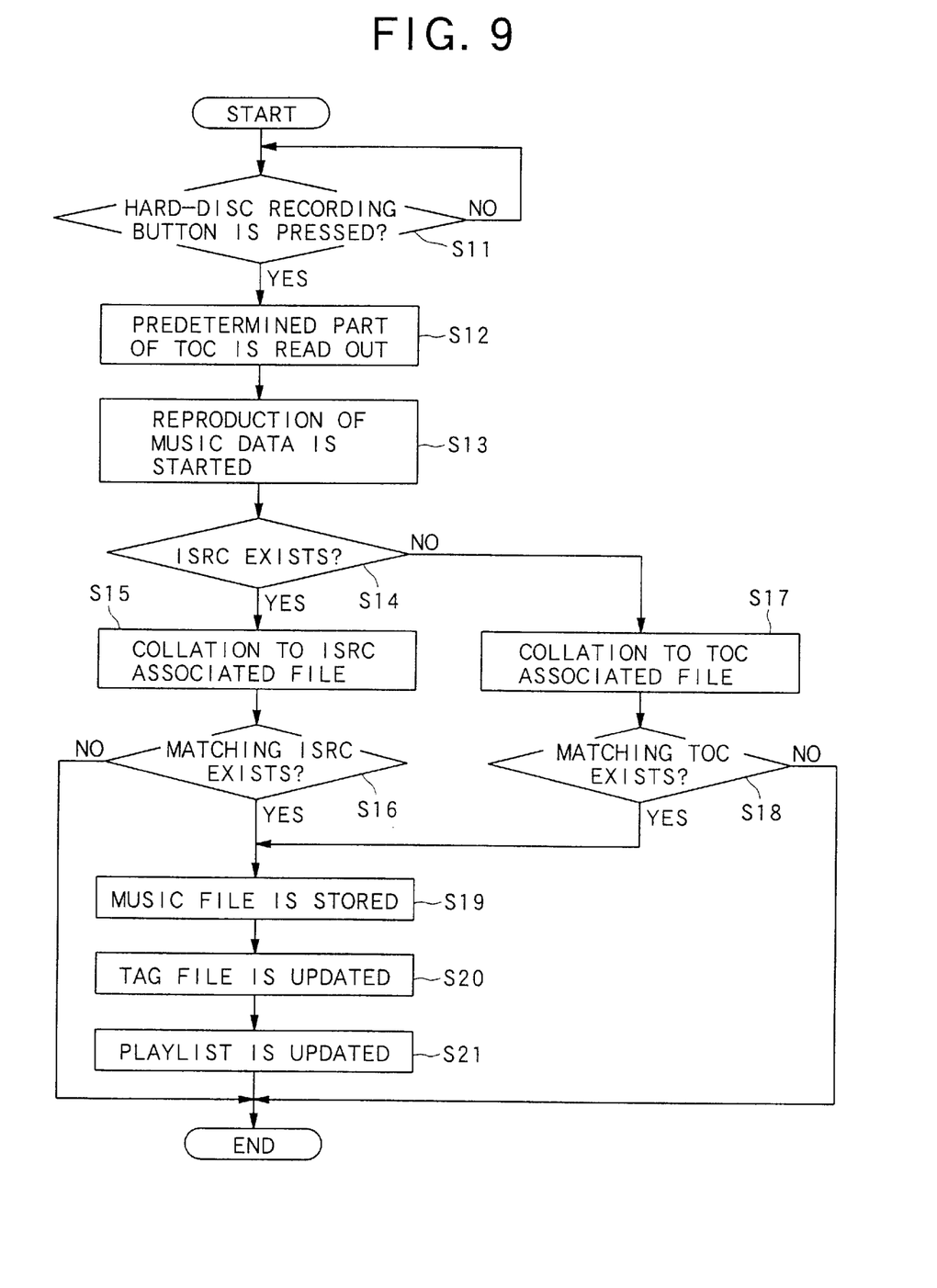
FIG. 9 is a flowchart showing a processing of recording to a hard disc by the recording/reproducing apparatus of this embodiment.

FIG. 9 is a flowchart explaining a recording processing on the hard disc 20 of the recording/reproducing apparatus of this embodiment. In FIG. 9, description will be given of the processing of the case where the user loads the disc 100 on which the music data have already been recorded in order to record the data on the hard disc 20.

First, there is monitored whether or not a hard disc recording button 23f (FIG. 12) of the recording/reproducing apparatus is pressed (step S11). As will be described later, the hard disc recording button 23f is arranged on a front panel 40 (FIG. 12) of the recording/reproducing apparatus, and is a button to be pressed when the user records on the hard disc 20 the music data recorded on the disc 100. In the cases where the hard disc recording button 23f is not pressed (step S11; NO) as a result of the judgement at the step S11, monitoring at the step S11 is continued.

On the other hand, in the cases where the hard disc recording button 23f is pressed (step S11; YES) as a result of the judgement at the step S11, data whose POINT is in a range of A0, A1, A2, 00, 01, 02 and 03 are read out from the TOC on the disc 100 (step S12), and are stored in the RAM 21. Then, the music data recorded on the program area 33 on the loaded disc 100 are read out continuously, and the reproducing operation is started (step S13). The subsequent processings are performed while the operation of reproducing the disc 100 is performed.

Then, judgment is made as to whether or not the ISRC is recorded on the Q channel of the sub-codes while the disc 100 is reproduced. If the ISRC is recorded on the disc 100 (step S14; YES) as a result, the ISRC of the song being reproduced is collated to the ISRC associated file stored in the hard disc 20 (step S15). More specifically, the data of the ISRC associated file are read from the headline for each line, and are sequentially compared to the ISRC on the disc 100. Then, judgment is made as to whether or not the matching ISRC exists in the ISRC associated file (step S16).

On the contrary, judgement is made that the ISRC is not recorded on the disc 100 at the step S14 (step S14; NO), the TOC held by the RAM 21 is collated to the TOC associated file stored in the hard disc 20 (step S17). More specifically, the data of the TOC associated file are read from the headline for each line, and are sequentially compared to the data of the TOC read out from the RAM 21. Then, judgment is made as to whether or not the matching TOC exists in the TOC associated file (step S18).

If the judgement result at the step S16 or the step S18 is "YES", the music file of the song being played is stored in the hard disc 20 (step S19). More specifically, the music file on which the music data are recorded is stored in a predetermined folder in the hard disc 20 as operation for recording the song being played. At this time, a tag file corresponding to the music file is prepared and stored in the predetermined folder of the hard disc 20 (step S20).

Figure 10A:
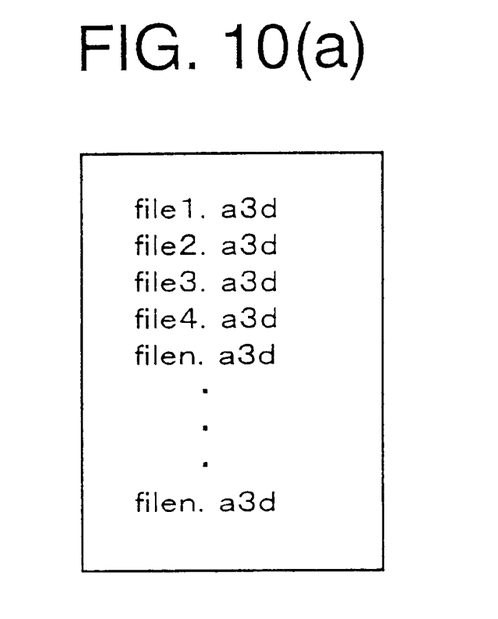
FIGS. 10(a) and 10(b) are diagrams showing a concrete example of a music file and a tag file.
Figure 10B:
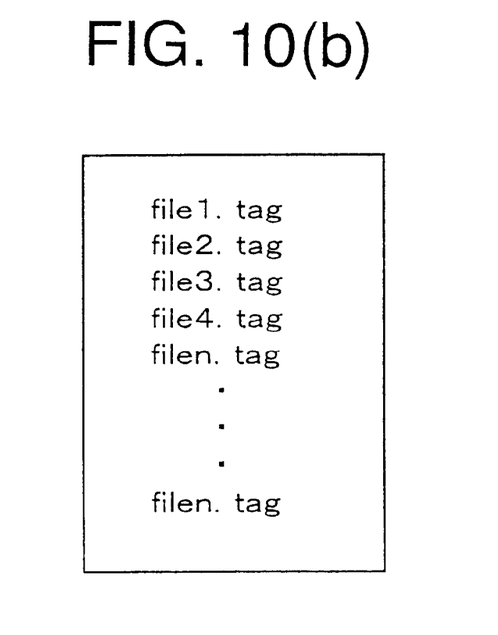

Description will be given of a concrete example of such a music file and such a tag file with reference to FIG. 10. FIG. 10(*a*) shows a state where the music files having the number of "n" corresponding to the recorded songs are stored in the predetermined folder in the hard disc 20. Each of the music files has a particular file name, and a respective common file extension given.

Moreover, FIG. 10(*b*) shows a state where the tag files having the number "n" corresponding to the recorded songs are stored in a predetermined folder in the hard disc 20. The information extracted from the TOC associated file or the ISCR associated file is written in each of the tag files. Each of the tag files has a file name corresponding to the music file, and a respective common file extension given.

In FIG. 9, a play-list managed in the hard disc 20 is updated in accordance with the processings at the step S19 and the step S20 (step S21). In this embodiment, the music files of the recorded songs are classified into groups, the respective music files are listed and registered for each group, and the list is managed as the play-list. Accordingly, when a music file is newly recorded, the play-list is updated by distinguishing the group to which the song belongs, and arranging the file names of the respective music files in order of reproduction.

Figure 11A:
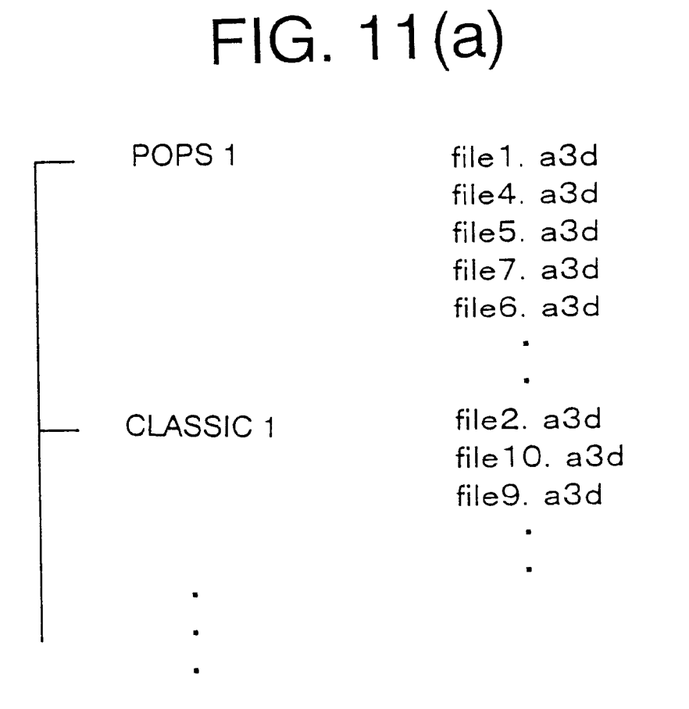
FIGS. 11(a) and 11(b) are diagrams showing a concrete example of a play-list in the hard disc.
Figure 11B:
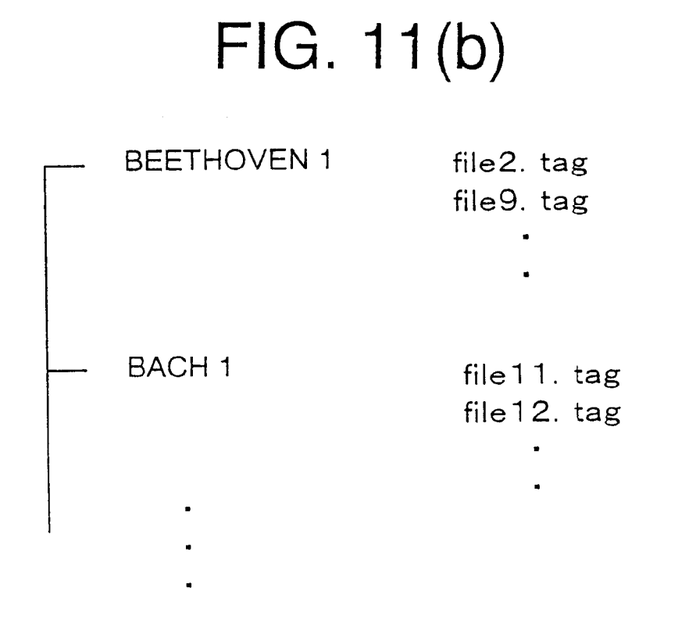

Description will be given of a concrete example of the play-list in the hard disc 20 with reference to FIG. 11. FIG. 11(*a*) shows an example where the recorded songs are classified into groups in accordance with the genres, and FIG. 11(*b*) shows an example where the recorded songs are classified into groups in accordance with the performers. The play-list shown in FIG. 11 is updated by referring to the tag file corresponding to the newly recorded song, distinguishing attributes such as the genre or the performer of the specific song, and registering the file name of the music data corresponding to the song on the play-list. The song that belongs to the specific group can be distinguished by referring to the play-list when reproduction is performed by using the hard disc 20. The processings in FIG. 9 are finished after the step S21.

On the other hand, in FIG. 9, when the judgement result at the step S16 or the step S18 is "NO", the processings in FIG. 9 are finished without performing the processings at steps S19 to S21.

In the processing shown in FIG. 9, there is described the cases where the play-list is automatically prepared when the music data are recorded, but there may be provided such a design that the user can selectively instruct whether or not the play-list is prepared. In this case, the processing of distinguishing the user's operation instruction is performed following the step S20, and the step S21 is performed when instructions on preparation of the play-list is given.

Moreover, concerning the processings shown in FIG. 9, there may be taken the design that, if the above-described processing related to classifying the songs into groups is performed by using the ISRC, the ISRC that is read out during reproduction of the disc 100 is once stored in the RAM 21, and the processing that is required for classifying the songs into groups is performed after the recording operation. In this case, the processing corresponding to the step S15 is performed by using the ISRC stored in the RAM 21 following the step S19.

Figure 12:
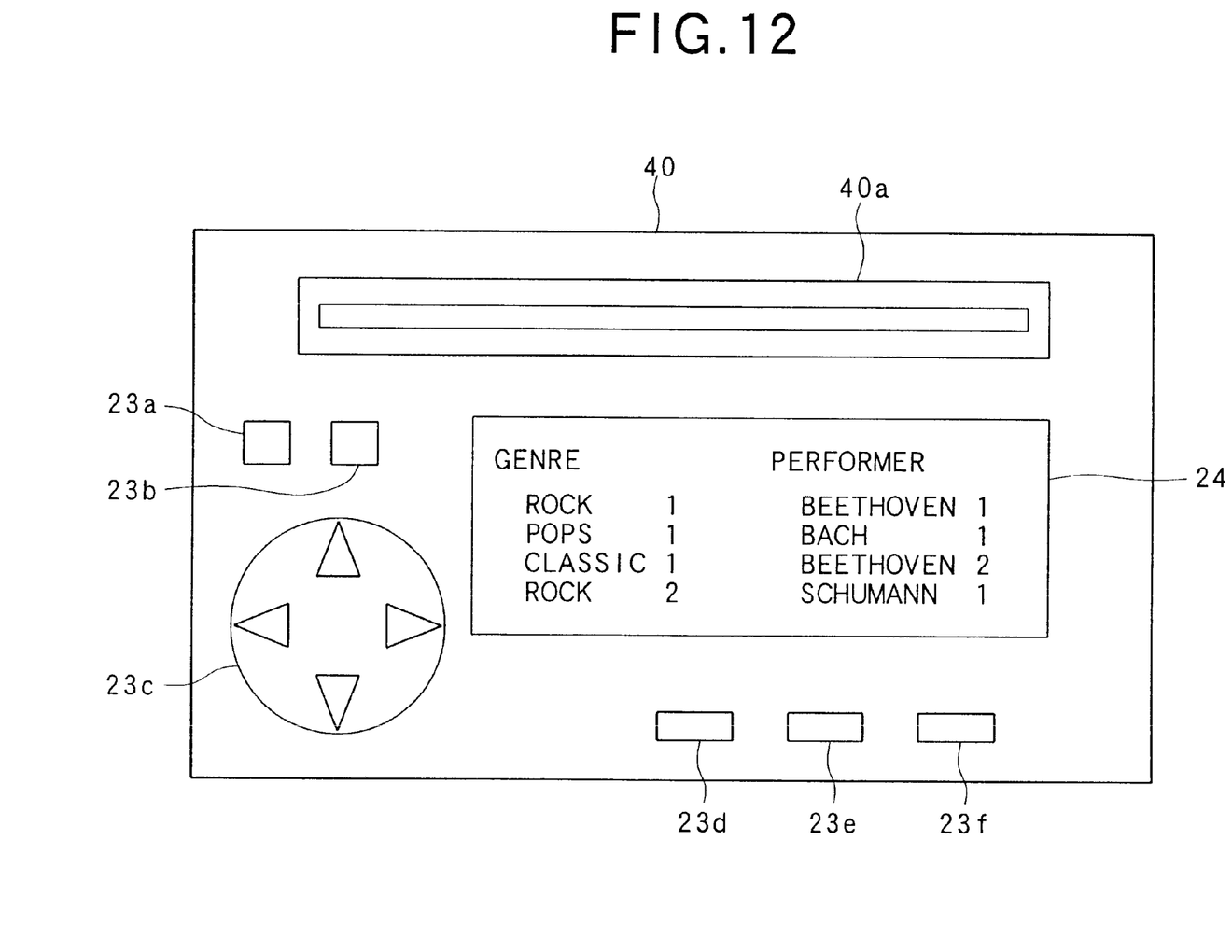
FIG. 12 is a diagram showing a configuration of a front panel of the recording/reproducing apparatus.

Now, description will be given of the operating portion 23 and the display portion 24 of the recording/reproducing apparatus with reference to FIG. 12. As is shown in FIG. 12, a front panel 40 of the recording/reproducing apparatus is composed of a display portion 24, a disc insertion opening 40*a* for the disc 100, and the operating portion 23 composed of mode buttons 23*a* and 23*b*, a jog dial 23*c*, a play-list display button 23*d*, a selection determination button 23*e*, and a hard disc recording button 23*f*.

The mode buttons 23*a* and 23*b* in the operating portion 23 are for switching the reproduction mode of the songs to either a CD or the hard disc 20. When the reproducing operation is performed, the music data on the disc 100 is reproduced by pressing the mode button 23*a* in order to switch the mode to the CD mode, and on the contrary, the music data stored in the hard disc 100 is reproduced by pressing the mode button 23*b* in order to switch the mode to the hard disc mode.

The jog dial 23*c* is a button for the user to select a specific item by placing a cursor indicated on the display portion 23. The jog dial 23*c* can be tilted to four directions of upward, downward, leftward, and rightward, and can move the cursor on the display portion 24 in correspondence with the direction to which the dial is tilted.

The play-list display button 23*d* is for displaying the above-described play-list on the display portion 23. The selection determination button 23*e* is, as is described above, for the user to select and determine a desired item on the display portion 23. The hard disc recording button 23*f* is, as is described above, for performing the operation of recording the music data recorded on the disc 100.

The display portion 24 provided near the center of the front panel 40 is composed of, for example, a crystalline liquid panel, and indicates character strings indicating various information in accordance with the user's operation. In the example in FIG. 12, a list of the performers and the genres corresponding to the play-list is indicated.

The disc 100 on which the music data are recorded is inserted into the disc insertion opening 40*a* on the upper portion of the front panel 40. When the reproduction mode is switched to the CD mode by pressing the mode button 23*a*, the songs on the inserted disc 100 can be reproduced.

In this manner, the user refers to the information indicated on the display portion 24, selects the desired genre and the song included in the genre through the user's operation, and starts the reproducing operation from the hard disc 20. Accordingly, the desired songs can be selected relatively easily even if enormous number of music data are recorded on the hard disc 20 so that there can be realized the recording/reproducing apparatus which is convenient and comfortable to use for the user.

In the above-described embodiment, description has been given of the cases where the present invention is applied to the recording/reproducing apparatus for performing the recording and reproducing operations of music data. However, it is possible to widely apply the present invention to the recording/reproducing apparatus for performing the recording and reproducing operations of various kinds of program data such as picture data.

Moreover, in this embodiment, description has been given of the cases where a CD is used as the disc 100. However, it is also possible to apply the present invention to other information recording media such as DVD or MD. Since the ISRC code is managed by using the TOC in the case of the MD, a processing shown in the step S15 in FIG. 9, that is to say, the processing of collating the ISRC and the ISRC associated file can be performed when the TOC is read out.

The entire disclosure of Japanese Patent Application No. 2000-099904 filed on Mar. 31, 2000 including the specification, claims, drawings and summary is incorporated herein by reference in its entirety.

What is claimed is:

1. A recording/reproducing apparatus comprising:
   a program data reading-out device for reading out program data from a recording medium on which the program data and identification information for identifying the program data are recorded, said recording medium being to be loaded into the program data reading-out device;
   a classification information storage device for previously holding classification information for classifying the program data in association with said identification information;
   a program data storage device in which a plurality of the program data can be written in and read out; and
   a controlling device for, when receiving a command for recording the program data, collating said identification information between said recording medium and said classification information storage device, for classifying the program data into groups in accordance with said classification information corresponding to the program data which is read out from said recording medium, and for controlling operation for recording the program data on said program data storage device, while controlling operation of reproducing predetermined program data which belong to the selected group when receiving a command for reproducing the program data.

2. The recording/reproducing apparatus according to claim 1, wherein said controlling device performs collation of said identification information during operation of reproducing the program data recorded on said recording medium.

3. The recording/reproducing apparatus according to claim 1, wherein said classification information storage device and said program data storage device comprises a hard-disc device.

4. The recording/reproducing apparatus according to claim 1, wherein a TOC (Table of Contents) for managing the data in said recording medium is extracted as said identification information, and said identification information to which the corresponding classification information is added is previously held by said classification information storage device.

5. The recording/reproducing apparatus according to claim 1, wherein said classification information storage device previously holds said classification information to which said identification information composed of ISRC (International Standard Recording Codes) attendant on the respective program data is added.

6. The recording/reproducing apparatus according to claim 1, wherein said program data is music data, and said classification information includes information indicating a performer corresponding to said music data.

7. The recording/reproducing apparatus according to claim 1, wherein said classification information includes information indicating a genre corresponding to said program data.

8. The recording/reproducing apparatus according to claim 1, wherein said program data and said classification information are recorded in a file format respectively, and are associated with each other by file names.

9. The recording/reproducing apparatus according to claim 8, wherein said controlling device creates and manages list data of the file names listed of said program data in each group so that said program data can be selected from a predetermined group on the basis of the list data.

10. A recording method for performing recording by using a recording medium on which program data and identification information for identifying the program data are recorded, a classification information storage device for previously holding classification information for classifying the program data in association with said identification information, and a program data storage device in which a plurality of program data can be written in and read out, comprising the steps of:
   when a command for recording the program data is received, collating said identification information between said recording medium and said classification information storage device while reading out the program data from said recording medium;
   classifying the program data read out from said recording medium into each group in accordance with said classification information corresponding to the program data; and
   recording said program data on said program data storage device.

* * * * *